United States Patent [19]

Angstadt

[11] 3,855,334

[45] Dec. 17, 1974

[54] SEPARATION OF 2,6-DIMETHYLNAPHTHALENE BY COMPLEXATION

[75] Inventor: Howard P. Angstadt, Media, Pa.

[73] Assignee: Sun Ventures, Inc., St. Davis, Pa.

[22] Filed: Oct. 29, 1973

[21] Appl. No.: 410,649

[52] U.S. Cl. .......... 260/674 N
[51] Int. Cl. .......... C07c 7/02
[58] Field of Search .......... 260/674 N

[56] References Cited

UNITED STATES PATENTS 3,725,490 4/1973 Nagahama et al. .......... 260/674

*Primary Examiner*—Delbert E. Gantz
*Assistant Examiner*—C. E. Spresser
*Attorney, Agent, or Firm*—George L. Church; Donald R. Johnson; J. Edward Hess

[57] ABSTRACT

2,6-Dimethylnaphthalene (2,6-DMN) is separated from a mixture of alkylnaphthalenes, particularly DMN isomers, by treating the mixture with 2-cyano-6-methylnaphthalene (2,6-CMN). The 2,6-CMN forms a complex with the 2,6-DMN which is then separated and heated to liberate substantially pure 2,6-DMN.

8 Claims, No Drawings

SEPARATION OF 2,6-DIMETHYLNAPHTHALENE BY COMPLEXATION

CROSS REFERENCE TO RELATED APPLICATION

Copending application, Ser. No. 410,650, filed of even date herewith by Howard P. Angstadt, discloses and claims the 2,6-CMN-2,6-DMN complex.

BACKGROUND OF THE INVENTION 2,6-DMN is useful in the manufacture of synthetic polyester fibers. It is well known that for this purpose the 2,6-DMN must be very pure as other DMN isomers seriously detract from the quality of the resulting fiber. The 2,6-DMN can be obtained from certain petroleum fractions where it occurs naturally or it can be made synthetically such as by the procedure described in copending application of Sheldon L. Thompson, Ser. No. 263,731, filed June 9, 1972, now U.S. Pat. No. 3,775,498. Use of either source of 2,6-DMN involves the problem of separating the 2,6-DMN from other DMN isomers. For example, although petroleum fractions such as heavy reformate bottoms and catalytic gas oils contain 2,6-DMN, all the other DMN isomers are also present. It is essentially impossible to separate 2,6-DMN from the fraction by distillation because of the closeness of the boiling points of 2,6-DMN and other isomers. For example, 2,6- and 2,7-DMN both boil at 504°F.

When made synthetically the same problem often arises. The aforesaid Thompson application discloses a process wherein o-xylene is reacted with butadiene to form o-tolylpentene-2 which is then dehydrocyclized to 1,5-dimethyltetralin and the latter is dehydrogenated and then isomerized to 2,6-DMN. The 2,6-DMN can be separated from the isomerizate by crystallization. Unfortunately the 2,6-DMN is found to also contain some 2,7-DMN for two reasons. One, any p-xylene contaminant in the o-xylene feed follows the corresponding reactions as the o-xylene resulting in 2,7-DMN. Secondly, in the isomerization step small amounts of 2,7-DMN are formed.

Accordingly, an efficient process for separating 2,6-DMN from other DMN isomers is highly desirable.

SUMMARY OF THE INVENTION

A mixture of DMN isomers including the 2,6-isomer is contacted with 2,6-CMN. The latter forms a complex selectively with 2,6-DMN and the complex can be precipitated by cooling. After separating the complex it is heated whereby it decomposes liberating 2,6-DMN.

DESCRIPTION OF THE INVENTION

The DMN isomer mixture containing 2,6-DMN can be a petroleum fraction such as a heavy reformate bottoms or a catalytic gas oil having a boiling range of say 460°–650°F. Such fractions will usually contain 10–30 percent 2,6-DMN and 1–20 percent each of most of the other DMN isomers. If the catalytic gas oil fraction is fractionated to separate a 460°–540°F fraction the DMNs are retained but certain other unwanted material such as trimethylnaphthalenes are removed.

Alternatively, the DMN isomer mixture can be a stream containing substantially all 2,6-DMN with very minor amounts, e.g. less than 5 percent, of, say, one other isomer such as the 2,7-isomer. Such a stream can be obtained in the aforesaid Thompson process.

The 2,6-CMN is obtained by heating 2,6-methylnaphthalenecarboxylic acid at 150°–300°C in the presence of ammonia and an alumina or zeolite dehydrating agent. The 2,6-methylnaphthalenecarboxylic acid can be obtained according to the procedure described in U.S. Pat. No. 3,340,155, issued Sept. 5, 1967 to J. D. Douros, Jr. et al.

The complexing can be carried out by contacting the 2,6-CMN with the liquid DMN isomer mixture. The petroleum fractions containing 2,6-DMN are of course liquid at ambient conditions. If a solid mixture of, say, 2,6- and 2,7-DMN is employed, as might be obtained from a synthetic 2,6-DMN process, the mixture should be dissolved in a solvent such as petroleum ether. The 2,6-CMN is also soluble in petroleum ether but the complex is less soluble and therefore precipitates. The exact solubility of the complex in ether is not known but ether:complex weight ratios of about 10:1 are generally satisfactory.

The complex contains equal molar amounts of 2,6-CMN and 2,6-DMN. The amount of 2,6-CMN employed is preferably less than or equal to one mole per mole of 2,6-DMN in the DMN isomer mixture.

The 2,6-CMN is not very soluble at room temperature in a petroleum fraction DMN isomer mixture and such a mixture plus 2,6-CMN is preferably heated to above 30°C, say 60°–65°C, to speed dissolution of the CMN which, once in solution, complexes with the 2,6-DMN isomer almost immediately. After the complex is formed the entire mass is cooled to effect precipitation of the complex. Cooling to or somewhat above room temperature is usually adequate and cooling too far below this is disadvantageous since material other than the 2,6-DMN:2,6-CMN complex will ultimately also precipitate. If petroleum ether or the like is the solvent for the DMNs heating and cooling is not necessary since the DMNs and 2,6-CMN are soluble in ether at room temperature whereas the complex is less soluble and therefore precipitates.

After separating the complex, as by filtration, the complex is heated to the boiling point of 2,6-DMN (262°C at 1 atm) which causes the complex to decompose liberating 2,6-DMN and leaving liquid 2,6-CMN (melting point 128°–129°C).

The recovered 2,6-DMN will usually be essentially pure, i.e., a purity above 95 percent by weight. The exact purity will vary depending upon the efficiency of the filtration or other separation steps employed, but the final 2,6-DMN product can if desired be recrystallized from alcohol to effect a final purification. Purities lower than 95 percent will be obtained if, for example, the cooling step is carried out at too low a temperature so that an impure complex is formed. In all embodiments of the invention, however, the 2,6-DMN finally recovered has a higher purity than in the original 2,6-containing DMN isomer mixture.

The invention can be carried out batchwise if desired. Alternatively it can be carried out continuously. For example, the complexing agent can be dissolved in a solvent such as sulfolane which is immiscible with the gas oil fraction and the gas oil contacted with the complexing agent solution in a continuous countercurrent extraction column. The 2,6-DMN is extracted as the complex into the solvent phase and is subsequently recovered therefrom by e.g., distillation.

EXAMPLE

One gram of a 460°–650°F catalytic gas oil was mixed with 2,6-CMN in the ratio of one mole of the latter per mole of 2,6-DMN in the gas oil. The mixture was heated to 60°–75°C and the 2,6-CMN dissolved. The solution was then cooled to room temperature and the resulting precipitate separated by filtration. The precipitate was analyzed by VPC, which effected a separation of the two components thereof, and shown to have an equal molar 2,6-DMN and 2,6-CMN composition. The purity of the 2,6-DMN was 99–100 weight percent.

The analysis (in weight percent) of the original gas oil and of the gas oil after the complex had been removed is as follows:

| | Before | After |
|---|---|---|
| Low ends | 3.5 | 4.0 |
| Naphthalene | 1.2 | 1.3 |
| 2-Ethylnaphthalene | 4.8 | 4.8 |
| Biphenyl | 0.1 | 0.2 |
| 2,6-DMN | 15.6 | 12.6 |
| 2,7-do. | 14.2 | 14.3 |
| 1,7-do. | 13.1 | 13.2 |
| 1,6- + 1,3-DMN | 26.1 | 27.2 |
| 2,3-DMN | 4.1 | 4.0 |
| 1,4-do. | 2.1 | 2.1 |
| 1,5-do. | 1.8 | 1.8 |
| 1,2-do. | 2.5 | 2.6 |
| Heavy ends | 10.8 | 10.7 |

It is apparent from the above that about 20 percent of the 2,6-DMN was removed. Since the ratio of all other ingredients is the same both before and after it is apparent none of those were removed.

Furthermore, a VPC analysis of the complex itself showed it to be composed of equal molar amounts of 2,6-DMN and 2,6-CMN. No other components present in the original gas oil mixture were found in the complex, thus indicating that 2,6-CMN is highly selective.

Upon heating another portion of the complex to 262°C at atmospheric pressure the 2,6-DMN distills off and is condensed. Its purity is 99–100 percent.

The invention claimed is:

1. Method of separating 2,6-DMN from a liquid mixture of 2,6-DMN and at least one other alkylnaphthalene which comprises a. contacting said mixture with 2-cyano-6-methylnaphthalene for a time sufficient for the latter to selectively complex with the 2,6-DMN, b. recovering the 2,6-DMN:2-cyano-6-methylnaphthalene complex, and c. recovering 2,6-DMN from the complex in a higher purity than in said liquid mixture.

2. Method according to claim 1 wherein in Step (a) the 2-cyano-6-methylnaphthalene is dissolved in the mixture at a temperature above 30°C and the resulting solution is, in Step (b), cooled to crystallize the complex.

3. Method according to claim 1 wherein the 2,6-DMN recovered from the complex has a purity of at least 95 percent.

4. Method according to claim 1 wherein said other alkylnaphthalene is principally 2,7-DMN.

5. Method according to claim 1 wherein said liquid mixture is a petroleum gas oil fraction boiling between 460°F and 650°F.

6. Method according to claim 1 wherein said other alkylnaphthalene is another dimethylnaphthalene.

7. Method according to claim 1 wherein said liquid mixture is a petroleum fraction.

8. Method according to claim 1 wherein in Step (a) 2-cyano-6-methylnaphthalene is dissolved in a solvent immiscible with said liquid mixture and said contacting is by countercurrent flow.

* * * * *